United States Patent [19]
Chawla

[11] Patent Number: 5,435,059
[45] Date of Patent: Jul. 25, 1995

[54] ADVANCE BALANCING PROCESS FOR CRANKSHAFT

[76] Inventor: Mohinder P. Chawla, 2041 Capri Ct., Wichita, Kans. 67207

[21] Appl. No.: 136,878

[22] Filed: Oct. 18, 1993

[51] Int. Cl.⁶ .............................................. B23P 15/00
[52] U.S. Cl. ................................... 29/888.08; 29/901; 74/603
[58] Field of Search ...................... 123/192 B; 74/603; 29/888.08, 901

[56] References Cited

U.S. PATENT DOCUMENTS

| | | | |
|---|---|---|---|
| 4,445,399 | 5/1984 | Sasaki et al. | 29/888.08 |
| 4,779,316 | 10/1988 | Cherry et al. | 29/888.08 |
| 5,000,141 | 3/1991 | Sugano | 29/888.08 |

*Primary Examiner*—Irene Cuda
*Attorney, Agent, or Firm*—Bradley P. Sylvester

[57] ABSTRACT

A balancing process for crankshafts that are assembled from a plurality of precisely machined, forged parts, in which the balancing process connects both revolving and reciprocating imbalances, allowing for optimum balancing conditions, which exceed the normal 50% balancing limit for weights that involve reciprocating unbalance. In this process, a substitute weight is positioned between two counterweight discs, that are part of corresponding sub assemblies of a temporary assembled crankshaft, with the substitute weight occupying the space normally occupied by the big end pin. The temporary assembled crankshaft, is placed on a dynamic balancing machine, and any imbalance is corrected. The connecting rod, prior to being assembled in the crankshaft, is balanced by placing the connecting rod on a weighing scale, that has been calibrated to zero position, using a master connecting rod of a known center of gravity. Necessary portions of the connecting rod are ground off, for correcting the error until the weighing scale readout returns to zero position. Once the connecting rod has been balanced, it is permanently installed with the big end pin as part of the fully assembled crankshaft.

1 Claim, 3 Drawing Sheets

ADVANCE BALANCING PROCESS FOR CRANKSHAFT

BACKGROUND OF THE INVENTION

Crankshafts for large internal combustion engines are generally forged as a single piece, and are attached to several cylinders. Motorcycle engines, scooter engines, and all other small internal combustion engines, generally have only one or two cylinders, and are designed to operate at high revolutions per minute during operation. These small engine crankshafts are often assembled from a set of forged and precisely machined parts, rather than forged as a single piece.

A crankshaft, that is assembled, has several common pieces for each engine cylinder. These pans comprise a one-piece connecting rod, a big end pin, and at least two counter weight discs. End journals are attached to the counter weight discs, with the end journals being the end of the crankshaft. The end journals and counter weight discs may also be forged as a single piece. The combination of end journal and counter weight disc, whether forged as a single piece or assembled together, is termed a sub assembly. All of these pans are precisely machined before they are assembled together to form a single crankshaft. This "assembled" crankshaft poses a special problem for balancing, as opposed to a single forged piece crankshaft. An assembled crankshaft has connecting rods that are assembled together with other parts of the crankshaft during the assembly process. Forged crankshafts have two piece connecting rods, that allow them to be connected to a forged single piece crankshaft after the balancing process. With a single cylinder, or very few cylinders in the engine, the need for accurate balancing is heightened, since these smaller engines are often designed to turn at high speeds, which heighten the effects of any imbalance.

Imbalance occurs primarily due to imperfection of parts, on account of the forging and machining process. Any irregularities cause unbalance during the crankshaft operation. These irregularities are usually unable to be determined, without balancing techniques performed on the crankshaft.

PRIOR ART

Manufacturers attempt to remove or correct any unbalance in all types of crankshafts, using conventional balancing processes that are applicable only for a single-piece crankshaft, where two piece connecting rods are fastened after the balancing is completed. This conventional balancing process comprises the steps of mounting the single piece crankshaft on a dynamic balancing machine and spinning to determine and correct unbalance. Following the conventional balancing process, two piece connecting rods are fastened on the crankshaft.

Various improvements in the balancing processes for single piece crankshaft have been disclosed in U.S. Pat. No. 5,000,141 (Sugano); U.S. Pat. No. 4,779,316 (Cherry et al); and U.S. Pat. No. 4,445,399 (Sasaki et al), but each of these patents fails to deal with the balancing problems in an assembled crankshaft. The Sugano patent, for example, uses adjustable balancing parts on a flywheel and pulley, to balance a single piece forged crankshaft. This process, however, does not deal with the special problems of a crankshaft that is assembled, rather than forged as a single piece, since two piece connecting rods are fastened to the single piece crankshaft after the balancing process is completed. The conventional balancing process, when applied to the crankshaft that is formed by assembling precision machined pans with a one piece connecting rod, that is permanently hinged to the crankshaft, poses special problems when correcting unbalance. The connecting rod swings around when the crankshaft is spinning on a balancing machine, making balancing almost impossible. In order to avoid swinging of the connecting rod, conditions must be simulated to account for guided motion for connecting rod and a cylinder. Assembled crankshafts cannot be balanced with optimum balancing conditions using the conventional balancing processes, and will generate significantly more vibration during operation. Crankshaft unbalance, due to imperfection of pans, in an assembled crankshaft, can only be corrected by fifty percent, using the conventional balancing process. It is necessary, therefore, to use a different balancing process for assembled crankshafts, than for one piece forged crankshafts, to obtain Optimum balancing conditions.

SUMMARY OF THE INVENTION

It is the object of this invention to provide a process for balancing an assembled crankshaft, so as to correct the unbalance to the optimum level in an operating crankshaft, when the unbalance is caused by imperfections of the parts due to the forging and machining process.

It is a further object of this invention to provide a process for balancing an assembled crankshaft, so as to correct the unbalance to the optimum level in an operating crankshaft through ascertaining and using a substitute revolving weight that provides a balancing counter force that is equal to the sum of the force exerted by one hundred percent of the revolving weight and fifty percent of the reciprocating weights, which is then used to check and correct the balancing counter weights in the crankshaft discs.

It is a further object of this invention to provide a process for balancing an assembled crankshaft, so as to correct the unbalance to the optimum level in an operating crankshaft, which reduces vibration in the engine during operation, extending the usable life of the engine, which improves product reliability.

It is a further object of this invention to provide a process for balancing an assembled crankshaft, so as to correct the unbalance to the optimum level in an operating crankshaft, which reduces vibrations generated by the engine, thereby minimizing customer discomfort and increasing customer satisfaction of the use of the engine.

It is a further object of this invention to provide a process for balancing an assembled crankshaft, so as to correct the unbalance to the optimum level in an operating crankshaft, which reduces vibrations generated by the engine, minimizing premature failure of various engine pans, which reduces the manufacturer's warranty cost, and maintenance cost to the customer.

It is a further object of this invention to provide a process for balancing an assembled crankshaft, so as to correct the unbalance to the optimum level in an operating crankshaft, which decreases the likelihood of an accident caused by an engine, improving personal safety of the customer.

This invention provides an advance balancing process for balancing a crankshaft, that is assembled from a variety of parts, rather than forged from a single piece. An assembled crankshaft is comprised of several forged parts, that are precisely machined prior to assembly.

To assemble this type of crankshaft, a big end pin is inserted through an aperture on the big end of a connecting rod, with both ends of the big end pin protruding outward from the end of the connecting rod. The connecting rod rotates freely around the big end pin. The small end of the connecting rod is designed for connection to a piston assembly. One end of the big end pin is pressed into a receiving pocket of a first counter weight disc, with the other end of the big end pin pressed into the receiving pocket of a second counter weight disc.

The discs are positioned so that they are directly parallel to one another, with the shape of each disc being a mirror image of the other disc. The counter weight discs include a counter weight, positioned 180 degrees in circumference from the receiving pocket, in which the counter weight is intended to provide a balance weight for the big end pin and connecting rod for the assembled parts and piston assembly during the spinning of the discs around a shared axis of rotation. The discs and the big end pin are permanently fixed together, at the point where the big end pin ends contact the receiving pockets.

An assembled crankshaft also has an end journal fixed to the center of the disc, at the axis of rotation, on the side opposite the side that has the receiving pocket. A disc and end journal, in combination, or forged as one piece, are referred to generally as a sub assembly. A majority of the assembled crankshafts currently being manufactured, have the end journal and disc forged as a single piece.

If the crankshaft operates more than one cylinder, a middle disc is positioned between the sub assemblies to allow an additional big end pin and connecting rod to be added while assemblying the crankshaft. The middle disc has a uniform thickness, and is not intended to hold counter balance weights. The middle disc has one receiving pocket on each side, with the receiving pockets positioned 180 degrees in circumference from the other. The receiving pockets on the center disc accommodate big end pin ends, which have connecting rods revolving around each big end pin. The discs comprising the sub assemblies, and the middle disc, are all positioned so that they will rotate around a shared axis of rotation.

All of the parts that comprise the assembled crankshaft, are subject to imperfections, due to the problems inherent with metal manufacturing. These imperfections affect the balance of the revolving and reciprocal forces exhibited by the assembled crankshaft as a whole, while rotating. Because the assembled crankshaft is "assembled" only when the connecting rods are positioned between the counter weight discs, and hinged by pressing in the big end pin permanently. The assembled crankshaft has reciprocating unbalance caused by the connecting rod and piston assembly.

Conventional balancing processes can correct revolving unbalance, but are unable to correctly balance reciprocating imbalances with greater than fifty percent accuracy. Therefore, the assembled crankshaft must be balanced prior to final assembly, and account for the revolving, as well as the reciprocating imbalances to obtain optimum balancing conditions.

A substitute revolving weight is determined through mathematical formula to account for the revolving and reciprocating weights of the big end pin, connecting rod, and piston assembly. Since a connecting rod accounts for a combination of revolving and reciprocating weight around its center of gravity, optimum balancing conditions require that the connecting rod, that is intended for eventual placement in the assembled crankshaft, has a known center of gravity. This is checked by placing the connecting rod on a weighing scale, with a fixture that allows the center of gravity of a connecting rod to be compared with a master connecting rod. The weighing scale is calibrated with a master connecting rod of known center of gravity. A connecting rod that does not have a matching center of gravity is ground to remove material until the center of gravity is in the correct position along the length of the connecting rod.

A substitute weight is temporarily positioned in the receiving pockets of the sub assemblies, occupying the place of the big end pin. This temporary assembly is placed on a dynamic balancing machine, and balanced on planes passing through the main bearing positions on the crankshaft. Unbalance is corrected by removing or adding material, to the discs at the point necessary to correct the imbalances. After this has been completed, the substitute weight is removed, and the crankshaft is permanently assembled.

DESCRIPTION OF THE PREFERRED EMBODIMENT

Figure 1:
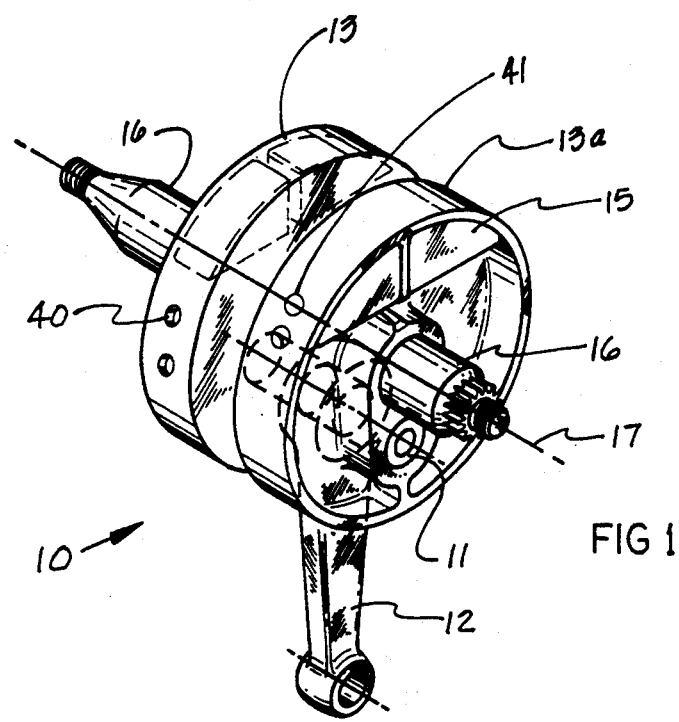
FIG. 1 shows a perspective view of a permanently assembled single cylinder crankshaft.
Figure 8:
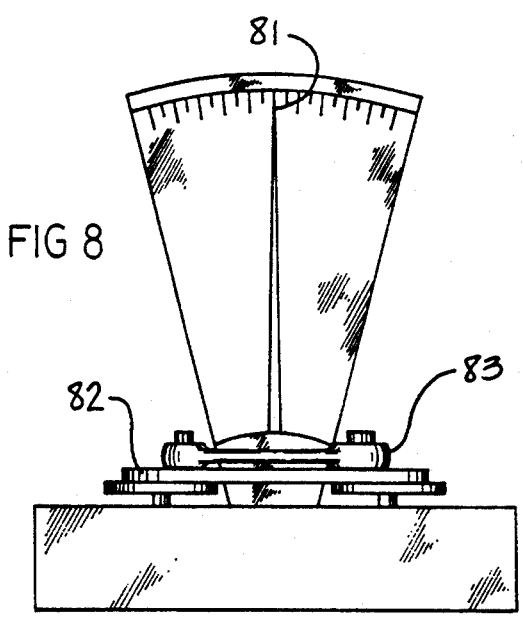
FIG. 8 shows a weighing scale having a fixture and a master connecting rod, that determines the shift of the center of gravity along the length of a connecting rod.
Figure 2:
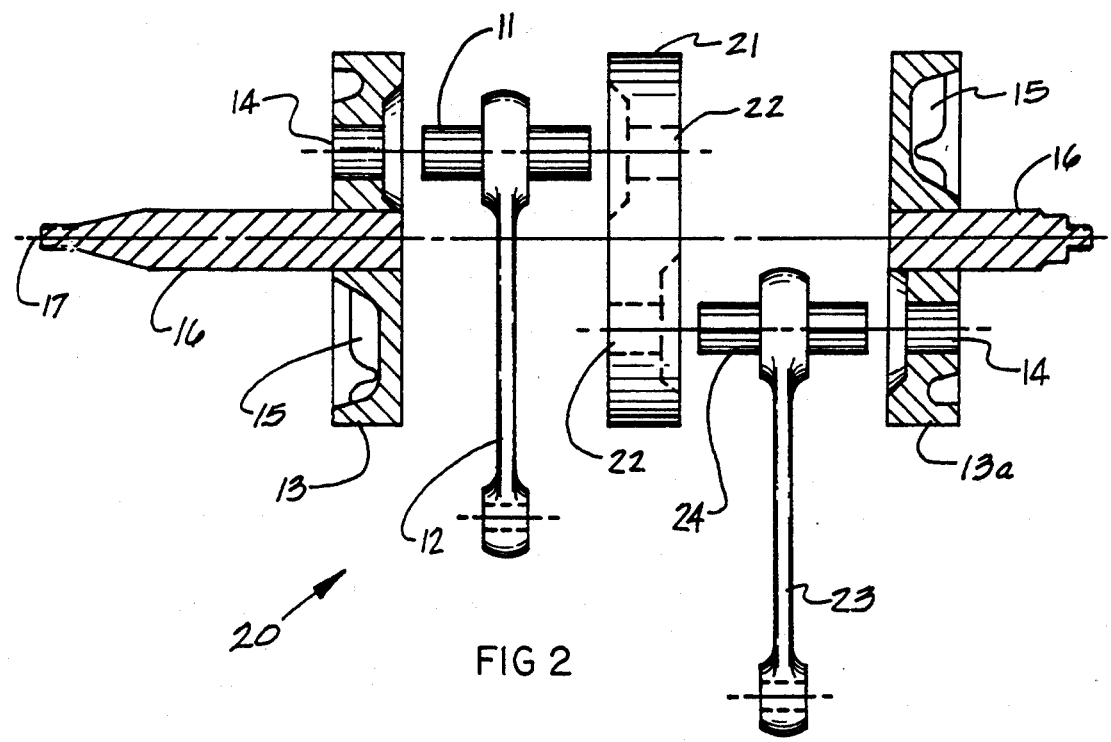
FIG. 2 shows an exploded cut-away view of a two cylinder crankshaft, having forged counterweights.
Figure 4:
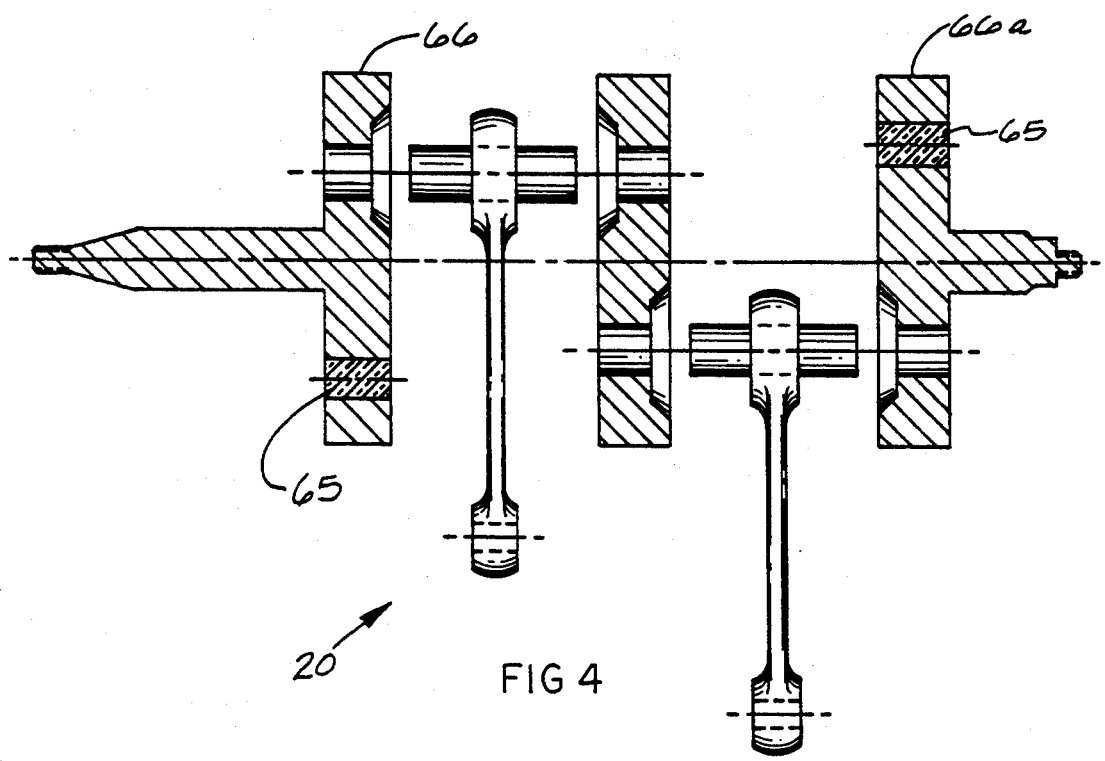
FIG. 4 shows an exploded cut-away view of a two cylinder crankshaft, having counter weights comprising heavy metal, such as lead, that is poured into an aperture of the sub assembly.

Referring to FIG. 1, a single cylinder engine crankshaft 10, is shown permanently assembled from a set of precisely forged machined parts. A shaft, known as an end journal 16 is fixed to the outer side of each disc 13 and 13a, with the end journal 16 sharing a common axis of rotation 17. Referring also to FIG. 2 & 4, this combination of disc 13 or 13a and end journal 16 is referred to as a sub assembly 66 or 66a. A sub assembly 66 or 66a can be forged as a single piece, or be a combination of disc 13, 13a, and end journal 16. To assemble this type of crankshaft, a big end pin 11 is inserted through an aperture on the big end of a connecting rod 12, and positioned so that the ends of the big end pin 11 protrude outward from each side of the connecting rod 12. The small end of the connecting rod 12 is designed for connection to a piston assembly (not shown).

The connecting rod 12 and big end pin 11 positioned therein, are positioned in between two discs 13 and 13a, that have an inner and outer side. Discs 13 and 13a are positioned so that their inner sides face each other, and when so positioned, are mirror images of one another. The inner side of each disc 13 and 13a defines a receiving pocket 14, that can receive the end of the big end pin 11. Counter weights 15 are positioned 180 degrees of circumference from the receiving pocket 14.

The ends of the big end pin 11 are pressed in permanently in the receiving pockets 14. The discs 13 and 13a remain in position so that they share a common axis of rotation 17.

Referring also to FIG. 4, where disc 13 and end journal 16 are forged as a single piece, that piece is referred to as a sub assembly 66; and where disc 13a and end journal 16a are forged as a single piece, that piece is referred to as a sub assembly 66a.

Referring also to FIG. 2 and 4, an exploded view of a crankshaft 20, that is designed for use in a two cylinder engine, is shown. A middle disc 21 is positioned between the discs 13 and 13a. The middle disc 21 is of uniform thickness, and has a receiving pocket 22 on each side, with the receiving pockets 22 being positioned 180 degrees of circumference from each other.

The middle disc 21 is positioned so that it shares the same common axis of rotation 17 with the other discs 13 and 13a. The middle disc 21 is positioned so that it can receive one of the ends of the big end pin 11, and one of the ends of the big end pin 24, with the other ends of said big end pins 11 and 24 pressed into the receiving pocket 14 on each disc 13 and 13a. Additional middle discs 21 are used, when the engine has additional cylinders.

When either of these crankshafts 10 or 20 is fully assembled, they have various imbalances, caused by imperfections that arise during the forging and machining processes. The forging process has coarse tolerances, and requires machining with forged surface reference to attempt to correct the weight distribution.

The counter weight 15 is located in each disc 13 and 13a to attempt to counteract the weight of the big end pin 11, connecting rod 12 and piston assembly (not shown), in a crankshaft 10 for a single cylinder engine, as well as the big end pin 24, connecting rod 23 and piston assembly, for a crankshaft in a two cylinder engine. If the counter weight 15 does not correct the total imbalance of a rotating crankshaft 10 or 20, as it rotates around the axis of rotation 17, additional weight can be added or subtracted by drilling a hole 40 from the discs 13 and 13a, or drilling out material and adding weight in the form of denser material 41 at various positions on the discs 13 and 13a, during the balancing process.

Optimal balancing of an assembled crankshaft 10 and 20 requires consideration of the differences between the unbalanced force, due to reciprocating mass and unbalanced force due to revolving mass. The former varies in magnitude and is constant in direction, while the latter is constant in magnitude and varies in direction.

No single revolving mass can be used to balance a reciprocating mass, but a partial balancing of reciprocating mass can be obtained by a revolving balancing mass. Considering only the revolving mass forces, one hundred percent balance can be achieved, using revolving weights. However, reciprocating masses can be balanced by a revolving mass only to a maximum of fifty percent of the total reciprocating imbalance.

Correction of revolving and reciprocating unbalance on crankshaft 10 and 20 is done by the revolving counter weights 15 provided at 180 degrees on the same distance from the axis of rotation 17.

The following tables show the types of forces that must be considered for each part of the crankshaft 10 and 20.

TABLE A (Crankshafts with discs and end journals formed separately)

| ITEM | | MOTION | |
|---|---|---|---|
| Drawing No. | Part | Revolving | Reciprocating |
| 11,24 | Big End Pin | Yes | No |
| 12,23 | Connecting Rod | Yes | Yes |
| 13,13a | Discs | Yes | No |
| 16 | End Journal | Yes | No |
| 21 | Middle Disc | Yes | No |
| (not shown) | Piston Assembly | No | Yes |

TABLE B (Crankshafts where disc and end journal forged as a single piece)

| ITEM | | MOTION | |
|---|---|---|---|
| Drawing No. | Part | Revolving | Reciprocating |
| 11,24 | Big End Pin | Yes | No |
| 12,23 | Connecting Rod | Yes | Yes |
| 66,66a | Sub Assembly | Yes | No |
| 21 | Middle Disc | Yes | No |
| (not shown) | Piston Assembly | No | Yes |

As is shown in Table A and Table B, the connecting rods 12 and 23 are subjected to both revolving and reciprocating motion, with the piston assembly exhibiting only reciprocating motion. The effects of a connecting rod 12 and 23 on the balance of a rotating crankshaft 10 or 20 depend on the design and distribution of weight on the connecting rod 12 and 23. Ascertaining the distribution of weight of the connecting rod 12 and 23 require consideration of the principles of Compound Pendulum and Equivalent Dynamic Systems as shown below.

Compound Pendulum Theory

Figure 5:
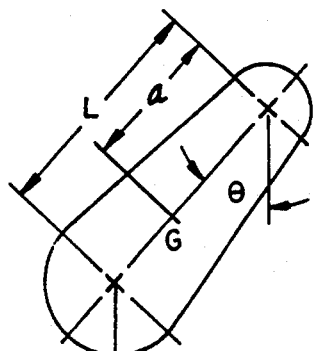
FIG. 5 shows a rigid body for a Compound Pendulum Theory.

Referring to FIG. 5, a rigid body that is suspended vertically, so as to oscillate with small amplitude under the action of gravity is termed a compound pendulum. Let (W) be the weight of the body, (m) the mass, (k) the radius of gyration about the axis through the center of gravity (G), and perpendicular to the plane of motion, and (a) is the distance of the point of suspension from the center of gravity.

Then the mass moment of inertia about the axis of suspension is given by:

$$I = m(k^2 + a^2).$$

The restoring couple $$T = W \cdot a \, \sin\theta \approx W \cdot a \cdot \theta$$

The angular acceleration of the pendulum $$= \alpha = T/I \simeq \frac{g \cdot a}{k^2 + a^2} \cdot \theta \simeq \text{constant} \cdot \theta$$

The motion of the pendulum is therefore approximately simple harmonic:

$$n = 1/2\pi \sqrt{\frac{g \cdot a}{k^2 + a^2}} = 1/2\pi \sqrt{\frac{g}{(k^2 + a^2)/a}}$$

Where (n) is the frequency of oscillation and (g) is acceleration due to gravity. If (L) is the length of an equivalent simple pendulum:

$$n = 1/2\pi \sqrt{g/L} \text{ or } L = \frac{g}{(2\pi \cdot n)^2} \quad \text{Eqn. (1)}$$

$$L = \frac{(k^2 + a^2)}{a} = \frac{(k^2)}{a} + a \text{ or } k^2 = a \cdot (L - a) \quad \text{Eqn. (2)}$$

Equivalent Dynamic System

Figure 6:
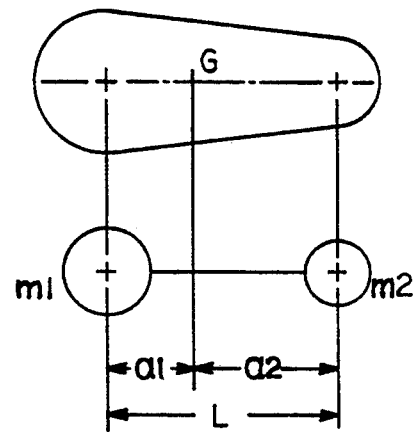
FIG. 6 shows a Rigid Body Equivalent Dynamic System for a connecting rod.

Referring to FIG. 6, in most problems on dynamics of rigid body, it is convenient to replace the body by two masses assumed to be concentrated at points and connected rigidly together. In order that the two-mass system shall be dynamically equivalent to the rigid body, it must react to a given system of forces in exactly the same way as the rigid body reacts. Therefore, the conditions that must be satisfied by the two-mass system are:

(a) Total mass must be equal to the rigid body;
(b) The center of gravity must coincide with that of the rigid body; and
(c) The total moment of inertia, about an axis through the center of gravity, must be equal to that of the rigid body.

Referring again to FIG. 6, let (m) be the mass, (k) the radius of gyration about the axis through G, of the rigid body; also let (m1) and (m2) be the two masses which form the equivalent dynamic system and (a1) and (a2) be the distances of (m0 and (m2) respectively from G.

Then the three conditions lead to the following equations:

$$m1 + m2 = m \quad (a)$$

$$m1 \cdot a1 = m2 \cdot a2 \quad (b)$$

$$m1 \cdot a1^2 + m2 \cdot a2^2 = m \cdot k^2 \quad (c)$$

Simplifying, we get:

$$m1 = \frac{m \cdot a2}{(a1 + a2)} \quad \text{Eqn. (3)}$$

$$m2 = \frac{m \cdot a1}{(a1 + a2)} \quad \text{Eqn. (4)}$$

Applying the above principles to the connecting rod 12 and 23, by actually determining the frequency of oscillation (n1) when the center of the small end coincides with the center of suspension and second time (n2) when center of big end coincides with the center of suspension. It is possible to compute the exact distribution of weights subjected to reciprocating and revolving motion respectively. To further clarify, the following example is given:

EXAMPLE

If a connecting rod weighing 90 pounds is 30 inches long in between centers of small and big end, it takes 84.4 seconds to complete 50 oscillations when the axis of oscillation coincides with the center of the small end and 80.3 seconds when axis of oscillation coincides with the center of big end. Hence:

$$a1 + a2 = 30 \text{ inches}$$

$$m1 \cdot g + m2 \cdot g = 90 \text{ pounds}$$

If (L1) and (L2) are the equivalent length of simple pendulum when axis of oscillation coincides with the center of small end and big respectively:

$$n1 = 50/84.4 \text{ and } n2 = 50/80.3$$

Now by equation (2) we find:

$$L1 = \frac{g}{(2\pi \cdot n1)^2} = 27.9 \text{ inches}$$

$$L2 = \frac{g}{(2\pi \cdot n2)^2} = 25.3 \text{ inches}$$

From equation (2) $k^2 = a1 \cdot (L1 - a1) = a2 \cdot (L2 - a2)$    Eqn.(5)

Substituting the values of L1 and L2 in equation (5) and with (a1 + a2) = 30 inches, we find the values of a1 and a2:

$$a1 = 20.7 \text{ inches and } a2 = 9.3 \text{ inches.}$$

Now substituting the values of a1 and a2 in equations .. (3 & 4):

$$m1 = w1/g = 90/g \cdot 9.3/30 \text{ or } w1 = 27.9 \text{ pounds.}$$

$$m2 = w2/g = 90/g \cdot 20.7/30 \text{ or } w2 = 62.1 \text{ pounds.}$$

Hence, the following are true, which completes the connecting rod distribution analysis:

(a) Reciprocating weight of the connecting rod w1 = 27.9 pounds; and
(b) Revolving weight of the connecting rod w2 = 62.1 pounds.

Now, referring to Table A, the unbalance weights subjected to revolving motion are added together, which include the big end pin 11 and 24 (if two cylinder crankshaft), the revolving portion, including the weight of any bearings, of the connecting rod 12 and 23 (if two cylinder crankshaft) and label the amount (Rv). Similarly, the total unbalance weights subjected to reciprocating motion, being the piston assembly and reciprocating portion of connecting rod, and any bearing weight associated with the small end of the connecting rod, and label the amount (Rc) The total effective unbalance of the crankshaft is corrected through counter weights provided on the discs or sub assemblies.

The total unbalance caused due to a revolving mass (Rv) is corrected by placing an equal mass on the discs at 180 degrees of circumference from the point of the unbalance force, at the same radial distance from the axis of rotation as the unbalance force is. Since only fifty percent of reciprocating mass unbalance (Rc) can be corrected by a revolving mass, when revolving weights are placed at 180 degrees of circumference from the point of the reciprocating unbalance force acting on the crankshaft. Therefore, Rc/2 can be balanced. The total maximum counterbalance weight $$= Rv + Rc/2, \text{ therefore,}$$

-continued the total counterbalancing weight for each of the discs $$= \frac{(Rv + Rc/2)}{2}$$

Figure 3:
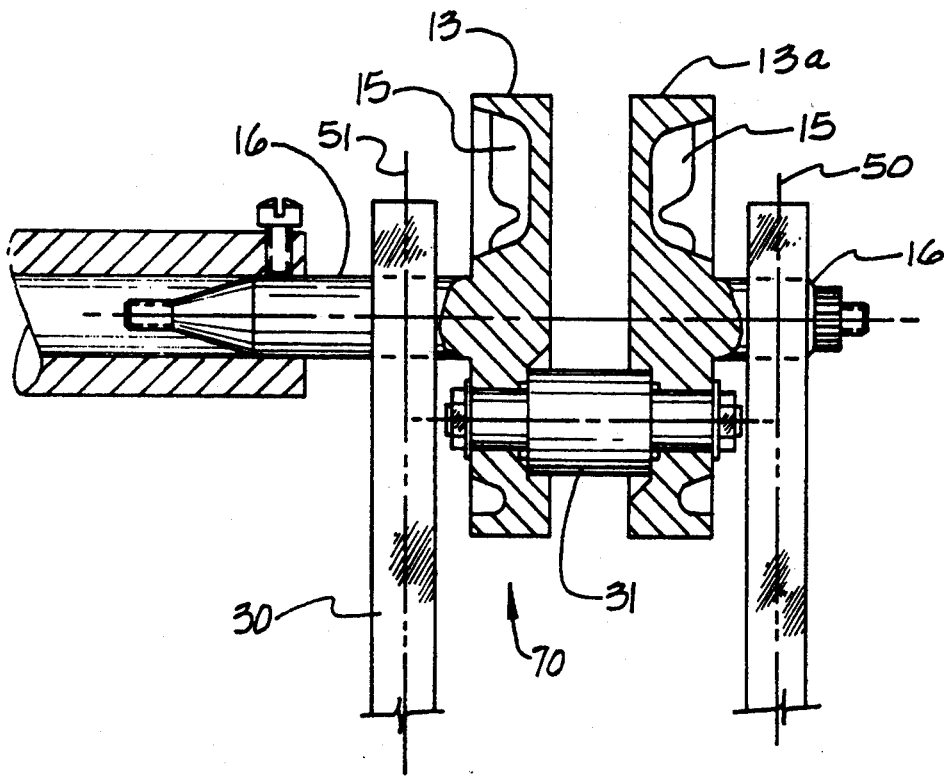
FIG. 3 shows a temporarily assembled single cylinder crankshaft, with a substitute weight occupying the place of the big end pin, on a dynamic balancing machine.
Figure 7:
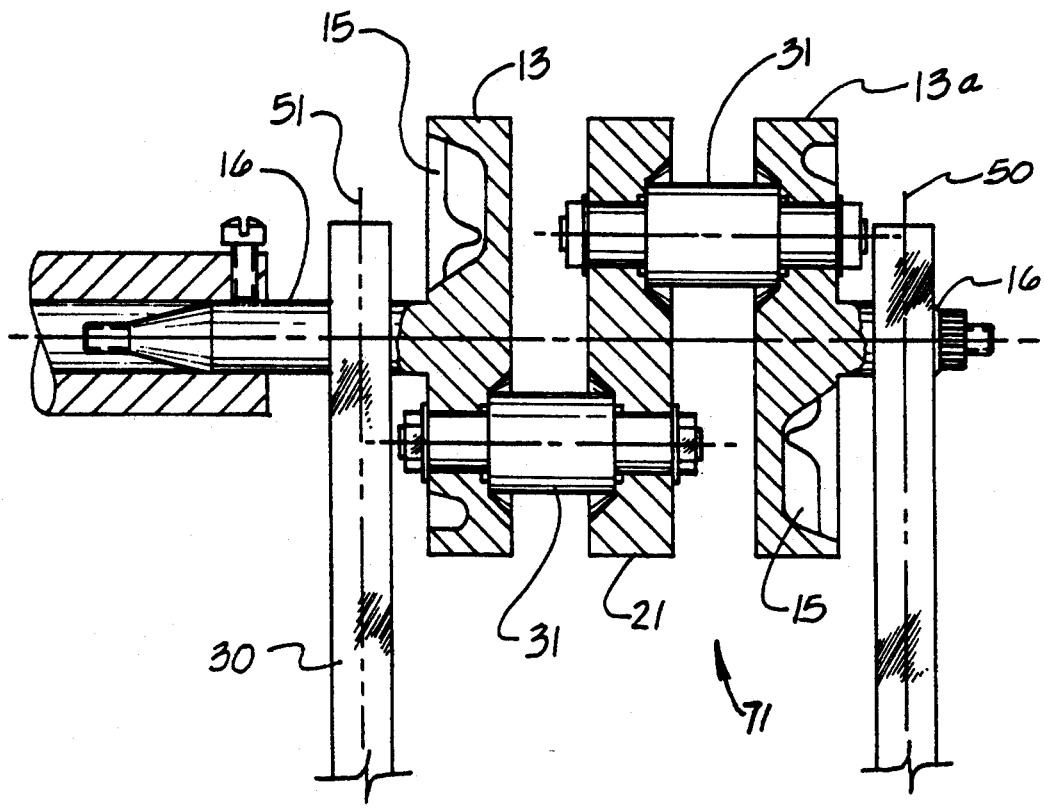
FIG. 7 shows a temporarily assembled two cylinder crankshaft, with a set of substitute weights occupying the place of the big end pins, on a dynamic balancing machine.

Referring to FIG. 3 and FIG. 7, a substitute weight 31 is positioned in a temporary crankshaft assembly 70 or 71, with the substitute weight 31 occupying the area normally filled by the big end pin 11 and 24 (as shown in FIG. 7). The total substitute weight(s) 31 has a mass equal to (Rv+Rc/2). The temporary crankshaft assembly 70 or 71 are placed on a dynamic balancing machine 30 and balanced on planes 50 and 51 which pass through the main bearing positions on temporary crankshaft assembly 70 or 71. The unbalance is corrected by removing material on the discs 13 and 13a, through drilling a hole 40 in the disc 13 or 13a, or filling a drilled portion with a heavier substance 41 to add mass at a point on the disc 13 or 13a. The substitute weights 31 are removed from the temporary crankshaft assemblies 70 and 71 for reuse.

The connecting rods 12 and 23 be checked to correct any shift in the center of gravity due to changes in weight distribution that arise during the manufacturing process. A master connecting rod 83, having a known position of center of gravity, is used to calibrate the weighing scale 80. The master connecting rod 83, having a known center of gravity, is placed on the weighing scale 80, which has a fixture 82 that holds the master connecting rod 83 in a fixed position. Once the master connecting rod 83 is in position, the settings of the weighing scale 80 are calibrated to a zero position 81.

The master connecting rod 83 is then removed from the weighing scale 80, and replaced by connecting rods 12 or 23, and error from zero position 81 is determined. Any error is corrected by grinding a portion of the connecting rod 12 or 23 off at the appropriate areas along their length.

Once the balancing of the temporary crankshaft assembly 70 or 71 has been completed on the dynamic balancing machine 30, using the substitute weights 31, and any errors in the center of gravity has been corrected on the connecting rods 12 and 23, the substitute weights 31 are removed, and the crankshaft 10 or 20 is permanently assembled using all other parts of the crankshaft.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims. The concept, techniques and calculations based on this process can also be applied to all machines where in the linear motion is converted to rotary motion through a connecting rod, including one piece crankshafts of internal combustion engines. Accordingly, the scope of this invention should be determined not by the embodiment illustrated, but by the appended claims and their legal equivalents.

I claim:

1. A process for balancing a crankshaft, that is assembled from a plurality of parts, comprising at least one big end pin, that is inserted through an aperture in the big end of a connecting rod, in which each of the big end pin ends are permanently pressed in a pocket of a counterweight disc, or in a pocket of a middle disc, where the counterweight disc has an end journal fixed to it, or the counterweight disc and end journal are forged together as a single piece subassembly, comprising the steps of:

(a) placing a substitute weight in place of the big end pin, in a temporary crankshaft assembly, where the substitute weight has a weight equal to a mathematically computed optimum weight of the revolving and reciprocating weights of the big end pin, a master connecting rod and piston assembly;

(b) positioning the temporary crankshaft assembly, having the substitute weight in place of the big end pin, on a dynamic balancing machine, and determining any imbalance;

(c) correcting any imbalance of the temporary crankshaft assembly, by removal or addition of weights at appropriate positions on the counterweight discs;

(d) placing a master connecting rod, having a known center of gravity, on a weighing scale having a fixture which positions the master connecting rod, and calibrating the scale to zero position;

(e) replacing the master connecting rod on the weighing scale, with a connecting rod to be included in the final assembly crankshaft;

(f) correcting error from zero position, by grinding a portion of the connecting rod at the appropriate area along its length;

(g) removing the substitute weight from the correctly balanced temporary assembled crankshaft, and assembling the crankshaft permanently, using the corrected connecting rod, along with all other pans of the crankshaft.

* * * * *